(12) United States Patent
Hoyer et al.

(10) Patent No.: US 6,339,610 B1
(45) Date of Patent: Jan. 15, 2002

(54) GLASS MELTING TANK AND PROCESS FOR MELTING GLASS

(75) Inventors: Patrick Hoyer, Grobenzell; Alfred Drechsler, Weiterstadt; Peter Elzner, Lorch; Frank-Thomas Lentes, Bingen, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/579,544

(22) Filed: May 26, 2000

(30) Foreign Application Priority Data

May 28, 1999 (DE) .......................................... 199 24 521

(51) Int. Cl.[7] .............................................. C03B 5/027
(52) U.S. Cl. .............................. 373/32; 373/27; 373/31; 373/41
(58) Field of Search ................................. 373/9, 27–36, 373/41; 65/134.1, 135.2, 135.7, 136.2, 325, 540

(56) References Cited

U.S. PATENT DOCUMENTS

| | | | |
|---|---|---|---|
| 2,225,617 A | * 12/1940 | Borel et al. | 373/41 |
| 2,990,438 A | * 6/1961 | Lambert et al. | 373/41 |
| 4,110,098 A | 8/1978 | Mattmuller | |
| 4,424,071 A | 1/1984 | Stetiz et al. | 65/337 |
| 4,438,518 A | * 3/1984 | Gaul et al. | 373/39 |
| 4,594,089 A | 6/1986 | Kurata | |
| 4,638,491 A | * 1/1987 | Perkins | 373/39 |
| 4,693,740 A | 9/1987 | Noiret | |
| 4,819,247 A | 4/1989 | Seng | |
| 4,900,337 A | 2/1990 | Zortea | |
| 5,574,746 A | * 11/1996 | Ammon et al. | 373/9 |

FOREIGN PATENT DOCUMENTS

| | | |
|---|---|---|
| DE | 234 262 A1 | 3/1986 |
| EP | 133 409 A | 2/1985 |
| EP | 304 371 A | 2/1989 |
| EP | 0 317 551 B1 | 5/1989 |
| EP | 0 393 882 A2 | 10/1990 |
| EP | 0 403 184 B1 | 4/1995 |
| FR | 2558821 A | 8/1985 |
| GB | 835 201 A | 4/1956 |
| GB | 2204310 A | 11/1988 |

OTHER PUBLICATIONS

Wolfgang Trier, "Glass Melting Furnance", Springer–Verlag, 1984, pp. 221–224, 229–232, 238–239.
Soviet Invnetions Illustrated Aug. 29, 1984 & SU 0 992 432 a (AS LATV Phys. Inst) Jan. 30, 1983.

* cited by examiner

Primary Examiner—Tu Ba Hoang
(74) Attorney, Agent, or Firm—Millen, White, Zelano & Branigan, P.C.

(57) ABSTRACT

A glass melting tank with at least one pair of heating electrodes projecting into the glass melt and a process for melting glass are described. The glass melting tank has, at least in the area of the melt, a narrowed cross section area and the glass melting tank has at least one heating electrode in front of and a corresponding heating electrode behind the narrowed cross section area and in this way an increase in the temperature of the melt can be achieved in the narrowed area. A preferred application is the refining of glass melts.

36 Claims, 4 Drawing Sheets

GLASS MELTING TANK AND PROCESS FOR MELTING GLASS

Figure 1:
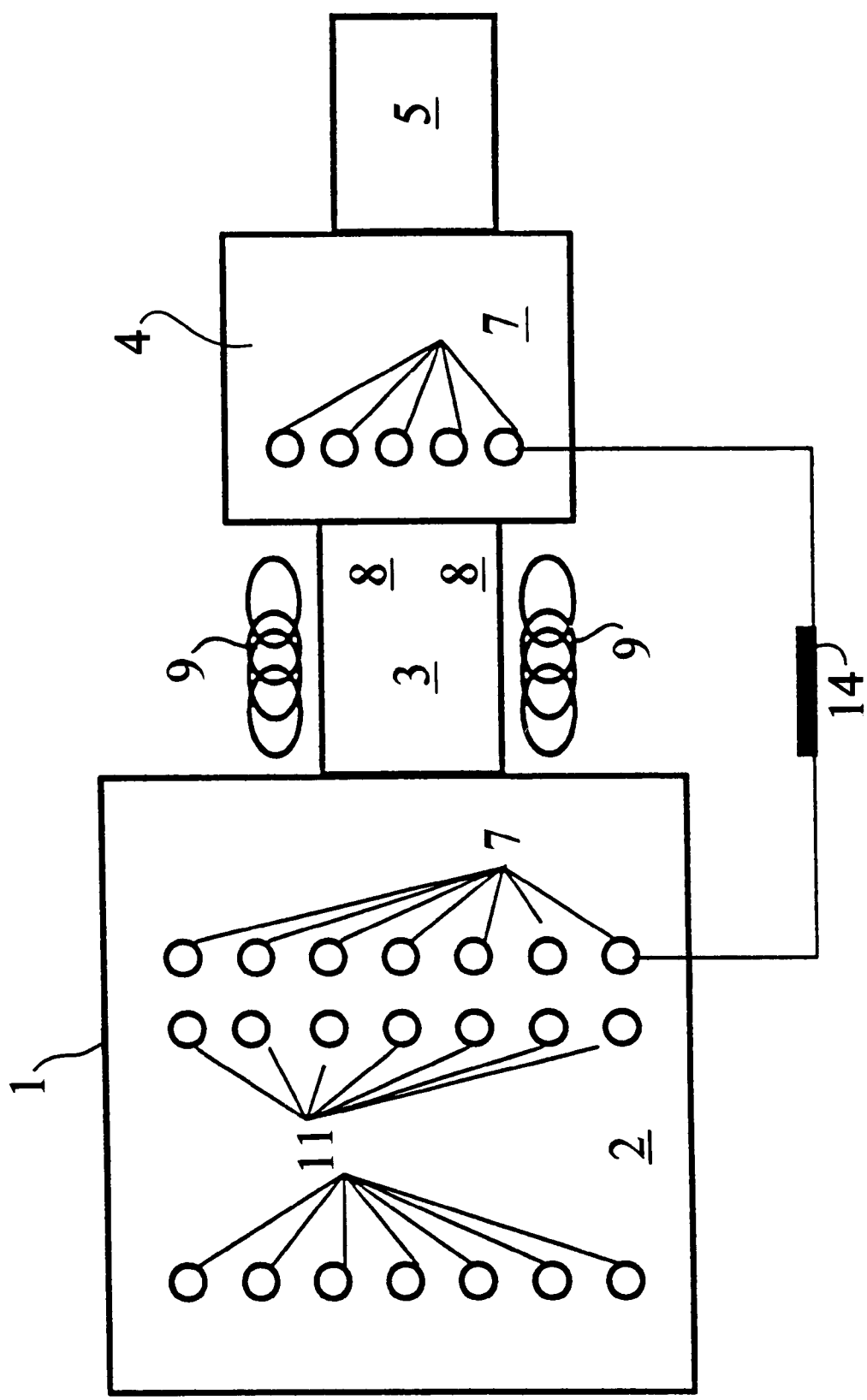

The invention relates to a glass melting tank and a process for melting glass. A preferred application is the refining of glass melts.

Glass melting tanks have been known for a long time, in particular, glass melting tanks that can be operated continuously were a precondition for the rise of large enterprises in the field of glass with industrial series production.

Here tanks are distinguished especially according to their construction type, their size, and their heating system.

The heating of glass melting tanks by direct electrical resistance heating, i.e., by conducting an electrical current through the glass melt by electrodes dipping into it, is an increasingly used process, since high efficiencies are reached in terms of thermal engineering. Fully electrical heating and supplemental electrical heating are found.

Usual materials for such electrodes are molybdenum (Mo), wolfram (W), platinum (Pt) and also zinc oxide ($SnO_2$).

In melting glass under oxidizing conditions or in melts that contain substances that are easily reduced, i.e. e.g., in lead-containing or arsenic- or antimony-containing glasses, corrosion of the electrode material, in particular of molybdenum, especially at high temperatures of the glass melt in contact with the electrodes, is a big problem.

Thus, e.g., a glass melting tank with an electrical heating system is known from U.S. Pat. No. 4,819,247 in which the heating electrodes and the corresponding counter-electrodes project into the melt from opposite lateral walls.

A process and a device, in particular a refining tank for melting glass, are known from EP 0 393 882 A2. The refining tank, made flat, can be heated electrically by electrodes that project into the melt from the lateral walls, in addition the tank has burners above the melt.

After the end of the rough melt, there remain in the melt, in addition to large amounts of dissolved gases, so many bubbles that the glass would be unusable. The object of refining is to remove the remaining bubbles, to reduce the concentration of dissolved gasses that could give rise to after generation of gas, and to homogenize the melt. Glass technology uses thermal, chemical, and mechanical aids or a combination of them for this purpose.

To support the refining thermally, the temperature of the melt is raised as high as possible to achieve higher partial pressures of the refining gas and thus an enlargement of the bubbles as well as, by reducing the viscosity of the melt, a more rapid elimination of the bubbles from the melt.

But countering the desire for a higher temperature of the melt, especially in the refining area of the tank, is the corrosion of the heating electrodes in the mentioned electrical heating systems, which is already a problem anyway. With increasing temperature of the melt, increasing electrode corrosion can be observed, since the electrodes project directly into the hot melt. Likewise problematic is the increasing corrosion of the tank as the temperature of the melt increases.

An object of the invention is to find a glass melting tank and a process for melting glass in which, by direct electrical heating of the melt, as high a temperature as possible of the melt, in particular in the refining area of the glass melting tank, is achieved and corrosion of the heating electrodes as well as of the glass melting tank can be kept slight.

Further, the tank and the process are to be able to be performed simply and with low investment costs using slight modification of already existing tanks and processes.

The glass melting tank has, at least in the area of the melt, a narrowed cross section area, and the glass melting tank has at least one heating electrode in front of and one heating electrode behind the narrowed cross section area and in this way it is possible to achieve an increase in the temperature of the melt in the narrowed cross section area.

In the process according to the invention for melting glass, the melt is introduced into a glass melting tank with a narrowed cross section area at least in the area of the melt, and the narrowed cross section area is heated by at least one heating electrode in front of and a corresponding heating electrode behind the narrowed cross section area and thus a zone of increased temperature of the melt is formed in the narrowed cross section area.

Because the glass melting tank according to the invention has, at least in the area of the melt, a narrowed cross section area and at least one heating electrode for direct electrical heating of the melt in front of, and a corresponding heating electrode behind the narrowed cross section projecting into the melt, it is advantageously possible to achieve very high temperatures of the melt inside the narrowed cross section area and simultaneously to keep electrode corrosion slight. The electrodes are located in the less hot area of the melt in front of and behind the narrowing.

The delivery of the heating current by the electrodes is performed in an area of the glass melting tank in which the temperatures of the melt that were usual up to now occur, so that electrode corrosion does not exceed the extent known up to now. The narrowed cross section area of the tank between the heating electrodes causes the flow lines to be pulled together. In this way, greater flow density and thus a higher temperature of the melt, locally separate from the location of the electrodes, are achieved in this area.

The respective size and geometry of the cross section narrowing has a considerable influence on the temperatures that can be achieved in the narrowed cross section area.

In a glass melting tank according to the invention that has a given narrowed cross section area, the temperature of the melt in the narrowed area can be adjusted and controlled essentially by the electrodes and, for example depending on the type and number of electrodes or on the type and magnitude of the operating voltage and of the current, a temperature adjustment and control can take place.

Thus, e.g., a temperature of the melt in the narrowed cross section area of up to 2000° C., and preferably of up to 1800° C., can be set. Here it is possible with difficulty, by heating the melt only with gas burners, to achieve the indicated high temperatures in the glass melting tank.

Use of heating electrodes in an area of the melt having the temperatures indicated would lead to a great increase in electrode corrosion because of the low viscosity of the melt.

The narrowed cross section area is preferably made by an inward arching of the lateral surface or by an inward arching of two opposite lateral surfaces of the glass melting tank.

Preferably the cross section narrowing of the tank is symmetrical, in particular symmetrical with respect to the lengthwise axis of the glass melting tank.

The cross section narrowing can also be constructed by a partial reduction in the tank depth, e.g., by inwardly arching the bottom surface of the tank.

Especially advantageous is a glass melting tank in which the narrowed cross section area is made by symmetrical inward arching of the opposite lateral surfaces as well as by a pronounced inward arching of the bottom surface.

Here it has turned out to be especially advantageous if the narrowed cross section area is up to 15% of the total length of the glass melting tank. Preferably the length of the narrowed cross section area is 150 to 460 cm, its width 40 to 150 cm and its depth 10 to 60 cm.

To keep the increasing tank corrosion slight at high melt temperatures, the wall of the tank is cooled at least in the narrowed cross section area. Preferably the wall here is cooled by water cooling. The cooling of the wall also cools the melt, which is in direct contact with the wall, and thus the corrosion of the wall is kept slight. The hot melt that is further away from the wall has contact only with the less hot melt but no direct contact with the wall.

The glass melting tank can be additionally heated in the narrowed cross section area by burners, in particular air/gas- and/or oxygen/gas burners. This results in a minimum surface temperature of the melt of about 1680° C.

The areas of the glass melting tank located in front of and/or behind the narrowed cross section area are preferably heated with electrodes and/or by burners, in particular air/gas and/or oxygen/gas burners.

In an especially preferred embodiment of the glass melting tank, the narrowed area is the refining area. The high temperature of the melt achievable according to the invention is used here essentially for the mentioned support of refining.

Because the part of the refining area located above the melt can be separated in a vapor-proof way from the rest of the tank, for example by partitions that project at least partially from above into the melt, the refining area located above the melt can be at least partially evacuated.

The use of vacuum additionally supports refining, and the low pressures above the melt make possible a rapid growth of bubbles and thus accelerate the rise of the bubbles in the melt that already has low viscosity.

The geometry of the narrowed cross section area is configured advantageously so that the melt has a large surface area relative to its volume, also to accelerate the driving out of bubbles. The ratio of volume to surface area of the melt in the narrowed area is preferably 1 m$^3$ to 4 m$^2$.

In an advantageous configuration of the invention, the electrodes project from below and/or from the lateral surfaces of the glass melting tank into the malt, and the electrodes can be used in the form of block electrodes. The electrodes are optionally cooled.

In principle, all previously cited electrodes can be used, and electrodes made of molybdenum are preferred, since molybdenum is relatively strong, economical and easily machined. Electrodes made of platinum are also used, and platinum is more corrosion resistant against glass melts.

The voltage between the electrodes is preferably up to 1500V, preferably up to 1000V, and the current is up to 7000 A, preferably up to 5000 A.

In principle all electrical heating processes are usable, in particular heating processes in which an alternating voltage with a frequency of up to 20 kHz is applied to the electrodes.

To keep floating, still incompletely dissolved substances on the surface of the glass melt away from the narrowed cross section area, a barrier (flow-through wall) can be placed in front of the narrowed cross section area, under which the melt flows through.

The glass melting tank according to the invention will be described in more detail based on the embodiments shown in the drawings but is not limited to the examples.

Figure 2:
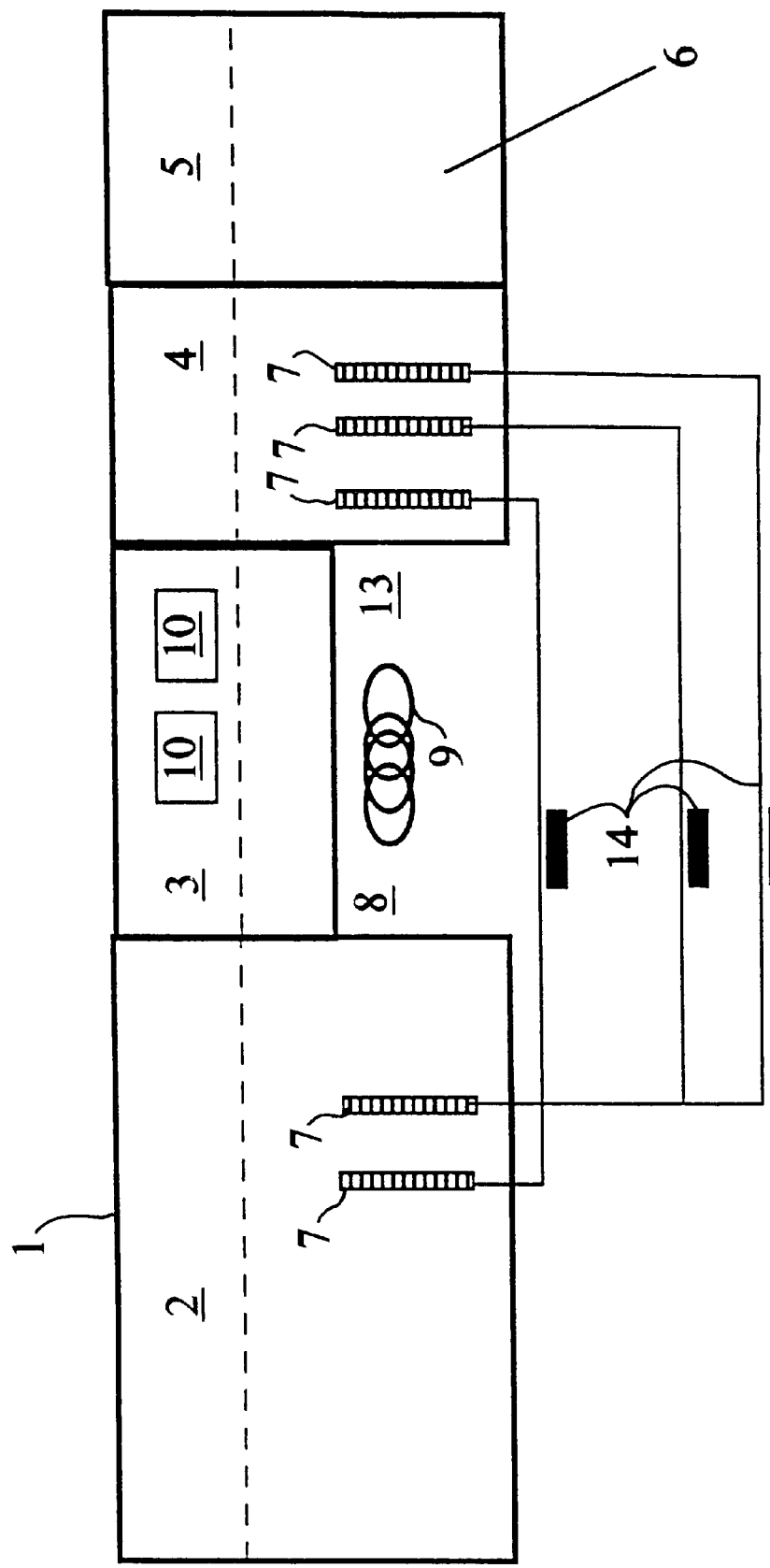
Figure 3:
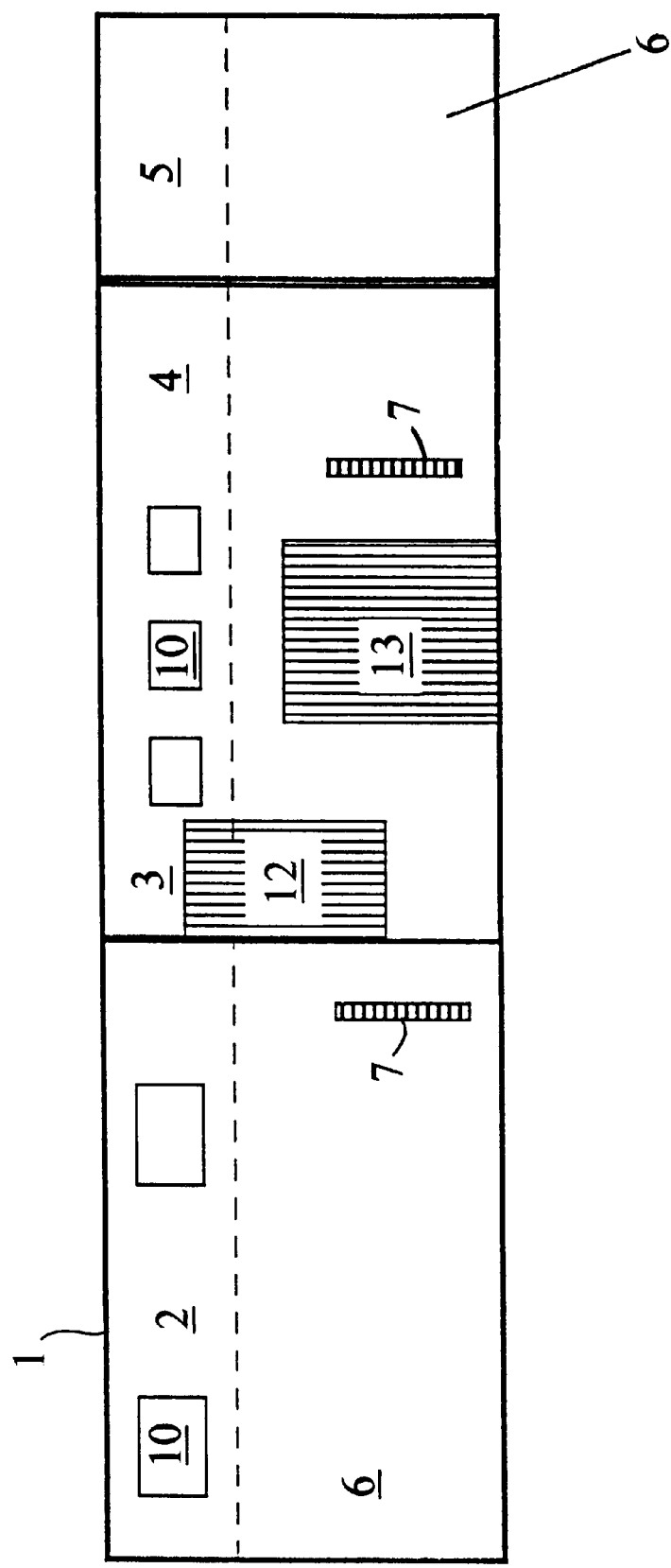
Figure 4:
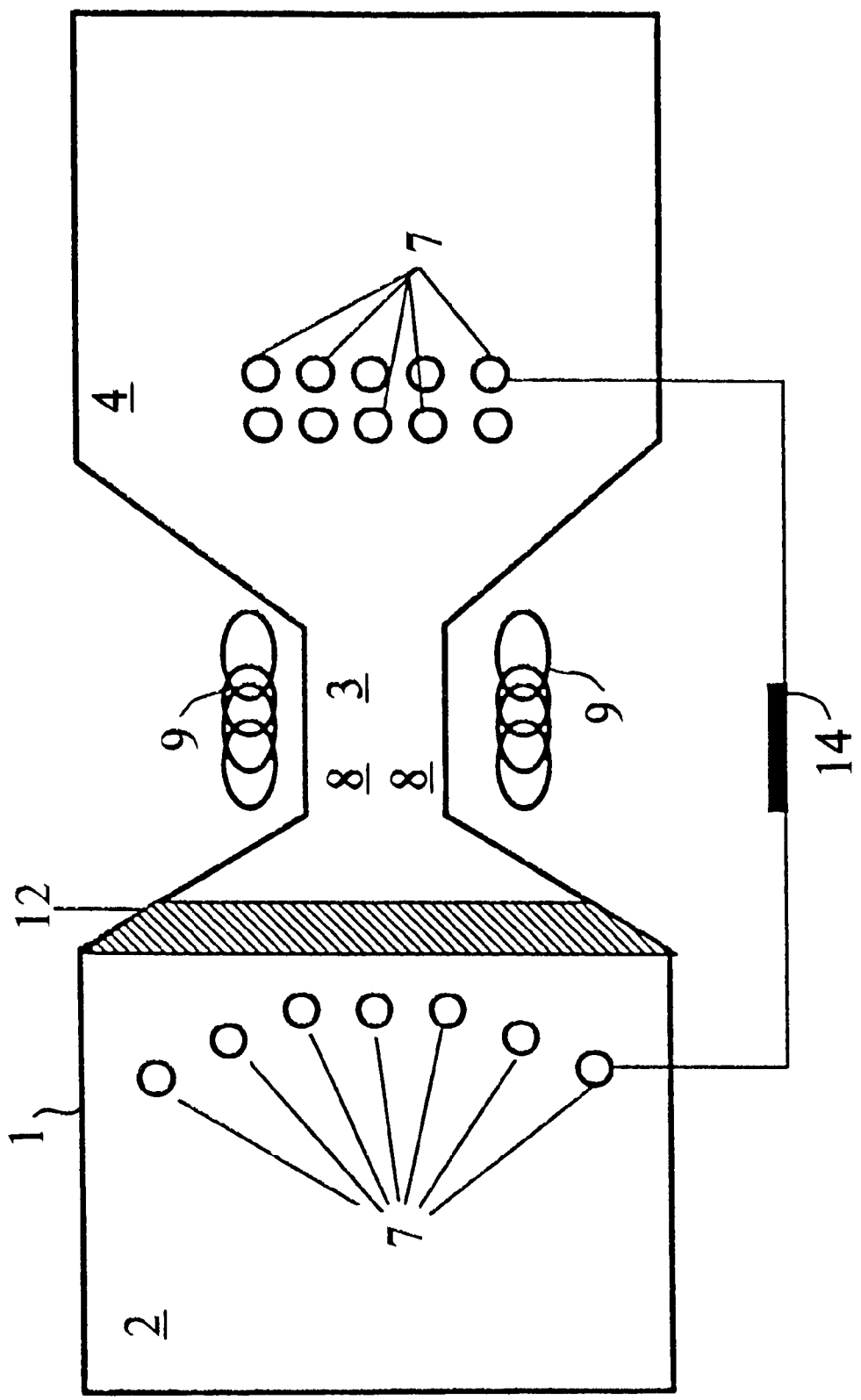

There are shown in:

FIG. 1, a diagrammatic representation of a preferred embodiment of the glass melting tank according to the invention in a top view, FIG. 2, a side view according to FIG. 1, but with a different heating electrode arrangement, FIG. 3, a side view of another embodiment of a glass melting tank according to the invention, FIG. 4, a top view of another embodiment of a glass melting tank according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above or below, and of corresponding German application No. 19924521.5, filed May 28, 1999 is hereby incorporated by reference.

FIG. 1 is a diagrammatic representation of a preferred embodiment of a glass melting tank 1 according to the invention in top view. Corresponding glass melting tank 1 is shown in FIG. 2 in a side view, but the electrodes are arranged differently.

Glass melting tank 1 is divided essentially into four areas. Thus tank 1 has a melt down 2, a narrowed cross section area 3, a cooling area 4 and a channel 5 to guide glass melt 6, for example for further processing, and the tank is generally covered on top by an arch.

Heating electrodes 7 of molybdenum, which are inserted into melt 6 from below through the tank bottom, are drawn in. The heating electrodes are operated by a transformer 14.

Seven heating electrodes 7 each are in melt down area 2 in front of narrowed cross section area 3 and five heating electrodes 7 each are in cooling area 4 behind the narrowed cross section area.

In FIG. 2, heating electrodes 7 are arranged somewhat offset to one another, and the electrodes in melt down area 2 are arranged in two rows and in cooling area 4 in three rows. The electrodes are operated by transformers 14.

Narrowed cross section area 3 is made symmetrically and is made by an inward arch 8 from two opposite lateral walls and by an inward arch 8 of the tank bottom.

The flow density between the heating electrodes is increased in the narrowed area because of narrowed cross section area 3 and thus an increase in the temperature of melt 6 is achieved apart from the location of the electrodes.

The size and geometry of the cross section narrowing has a considerable influence on the increase in flow density that can be achieved and on the associated increase in the temperature of the melt in the narrowed area.

In a glass melting tank 1 according to the invention with a given size and geometry of narrowed area 3, the temperature of the melt can be adjusted and controlled essentially by the current flow through electrodes 7, and in particular the heating voltage and heating current or the power can be adjusted and controlled.

Further, simple model calculations were performed to determine the expected energy consumption for heating a 1600° C. hot glass melt to 2000° C. in the narrowed cross section area. The energy consumption was calculated for various geometries of the narrowed cross section area of a glass melting tank represented diagrammatically in FIGS. 1 or 2.

The results of these model calculations are shown below. The calculations were performed for the following conditions:

| | |
|---|---|
| width of melt down and cooling area | 400 cm |
| height of the melt in the melt down and cooling area | 100 cm |
| spacing of the rod electrodes in front of and behind the narrowed cross section area | 150 cm |
| lateral spacing of the rod electrodes | 30 cm |
| diameter of the rod electrodes | 50 mm |
| volume of the melt in the narrowed area | 600,000 cm$^3$ |
| heat output in heating the glass melt from 1600° C. to 2000° C. in the narrowed area | 500 KW |
| specific resistance of the 1600° C. hot glass melt in the melt down and cooling area | 3.0 Ω cm |
| drifting losses in the melt down and cooling area | none |
| specific resistance of the 2000° C. hot glass melt in the narrowed area | 1.7 Ω cm |
| drifting losses in the narrowed area | 60 W/cm$^2$ |

In the model calculations, the geometry of the narrowed area (length×height×width) was varied, while the volume of the melt was kept at 600,000 cm$^3$, and thus the respective heat output (energy consumption) was determined. Thus, e.g., for a glass melting tank 1 according to the invention, under the above-mentioned assumptions with a narrowed cross section area 3 having a melt volume (height×width× length) of 50 cm×40 cm×300 cm, there resulted a heating current of 4551 A, a heating voltage of 845 V and a relatively low overall heat output of 3.85 MW, and the heat energy was distributed as 233 kW in front of the narrowing, 3.38 MW in the area of the narrowing, and 233 kW behind the narrowing with a resistance of the melt of 0.0113 Ω, 0.1632 Ω and 0.0113 Ω.

To heat a glass melt with the same volume in a tank with a narrowed area with dimensions of 15 cm×90 cm×444 cm also from 1600° C. to 2000° C., 6.35 MW of heat output are needed overall.

Reduction in the volume of the melt in the narrowed area can achieve a clear reduction in the energy to be delivered.

The model calculations clearly show that the size and geometry of the narrowed area have a big influence on the heat output to be delivered.

Glass melting tank 1 represented further shows a water cooling 9 of the wall in the area of narrowing 3. By cooling the wall, wall corrosion is reduced in the area in which the melt is very hot. The melt cooled on the wall simultaneously protects the wall from the very hot melt inside the narrowed area.

Burners 10, in particular air/gas and/or oxygen/gas burners, make it possible to have additional heating of the melt. This is especially advantageous if narrowed area 3 is the refining area. The large surface area of the melt preferred in refiners with respect to their volume is accompanied by high heat losses and thus especially a cooling of the melt on its surface. The additional burner heating counteracts the surface cooling and thus positively supports the refining.

In the melt down area, six pairs of heating electrodes 11 made of molybdenum that project from below into melt 6 are shown. In this area the melt is heated by direct electrical heating to temperatures usual up to now.

FIG. 3 shows another embodiment of the invention. Narrowed cross section area 3 between heating electrode pairs 7 is formed by the sequence of a flow-through wall 12 and a bottom wall 13. Flow-through wall 12 extends from a lateral wall of the tank to the opposite wall and separates the melt in its upper area completely from the area lying behind it, and the melt can flow only between the underside of flow-through wall 12 and the tank bottom. At a distance to flow-through wall 12 there follows bottom wall 13, which also extends from the lateral wall to the opposite wall of the tank and from the tank bottom up to almost the surface of melt 6. Burners 10 make additional heating of melt 6 possible in narrowed area 3, as well as the only heating in melt down area 2.

Glass melting tank 1 according to the invention, represented in top view in FIG. 4, also has a cross section area 3 narrowed symmetrically with respect to the lengthwise axis of the tank. Narrowed cross section area 3 is made by an inward arching 8 of two opposite lateral walls and by an inward arching of the tank bottom. But the lateral walls, in contrast to the embodiment represented in FIGS. 1 and 2, are made slanted in the transition to the narrowed area. Between heating electrodes 7 in melt down area 2 and narrowed cross section area 3 there is a flow-through wall 12. Because wall 12 does not lie directly in the narrowed area, its cooling is not absolutely necessary. Heating electrodes 7 are placed in melt down area 2 on a segment of a circle and in cooling area 4 in two rows and are operated by a transformer 14. In the area of highest flow density, and thus the highest temperature of the glass melt, glass melting tank 1 is cooled by cooling 9.

The glass melting tank according to the invention and the process according to the invention for melting glass can be achieved simply and with low investment costs by slight modifications of existing tanks and processes. The melt can be heated to very high temperatures without the heating electrodes being exposed directly to these temperatures, keeping electrode corrosion slight. Cooling the tank in the area of the high temperatures of the melt effectively minimizes tank corrosion also. The achievable high temperatures and the reduction of the viscosity of the melt associated with it extraordinarily support the refining of the glass melt.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A glass melting tank for containing a glass melt, comprising at least one pair of heating electrodes projecting into the glass melt, wherein the glass melting tank has, at least in the area of the glass melt, a narrowed symmetric cross-sectional area formed by an inward arching of surfaces of the glass melting tank, wherein the narrowed cross-sectional area has a length which is up to 15% of the overall length of the glass melting tank, and wherein the glass melting tank has at least one heating electrode in front of and one corresponding heating electrode behind the narrowed cross-sectional area to achieve an increase in the temperature of the glass melt in the narrowed cross-sectional area, the temperature of the glass melt in the narrowed cross-sectional area being adjustable and controllable through the heating electrode in front of and the corresponding heating electrode behind the narrowed cross-sectional area.

2. A glass melting tank according to claim 1, wherein the narrowed cross section area is formed by an inward arching of a lateral surface or an inward arching of two opposite lateral surfaces of the glass melting tank.

3. A glass melting tank according to claim 1, wherein the narrowed cross section area is formed by an inward arching of the bottom surface of the glass melting tank.

4. A glass melting tank according to claim 1, wherein the narrowed cross section area of the glass melting tank is a glass refining area.

5. A glass melting tank according to claim 1, wherein a part of the refining area located above the melt is separated from the rest of the glass melting tank so as to be vaporproof.

6. A glass melting tank according to claim 1, wherein the heating electrode in front of and the corresponding heating electrode behind the narrowed cross-sectional area project into the melt from locations which include a bottom and the lateral surfaces of the glass melting tank.

7. A glass melting tank according to claim 1, wherein the narrowed cross section area has a length of 150 to 460 cm, a width of 40 to 150 cm and a depth of 10 to 60 cm.

8. A glass melting tank according to claim 7, wherein the wall of the glass melting tank has a cooling element at least in the narrowed cross section area thereof.

9. A glass melting tank according to claim 8, wherein the glass melting tank includes burners in the narrowed cross-sectional area, the burners being air/gas burners or oxygen/gas burners.

10. A glass melting tank according to claim 9, wherein the areas of the glass melting tank that are located in front of or behind the narrowed cross-sectional area are heated by electrodes, by air/gas burners or by oxygen/gas burners.

11. A glass melting tank according to claim 10, wherein the narrowed cross section area of the glass melting tank is a glass refining area.

12. A glass melting tank according to claim 11, wherein the part of the refining area located above the melt is separated from the rest of the glass melting tank so as to be vapor-proof.

13. A glass melting tank according to claim 12, wherein the part of the refining area located above the melt is at least partially evacuated.

14. A glass melting tank according to claim 13, wherein in the refining area is wider than it is deep and thus a large surface area of the melt, relative to the volume of the melt is achieved.

15. A glass melting tank according to claim 6, wherein the heating electrode in front of and the corresponding heating electrode behind the narrowed cross-sectional area are made of molybdenum or platinum.

16. A process for melting glass comprising introducing melt into a glass melting tank having a cross-sectional area narrowed at least in the area of the melt, heating the narrowed cross-sectional area by at least one heating electrode in front of and a corresponding heating electrode behind the narrowed cross-sectional area, wherein a zone of increased temperature of the melt is formed in the narrowed cross-sectional area, and cooling the wall of the glass melting tank at least in the narrowed cross-sectional area, wherein the melt has a lower temperature in an edge area thereof.

17. A process for melting glass comprising introducing melt into a glass melting tank having a cross-sectional area narrowed at least in the area of the melt, heating the narrowed cross-sectional area by at least one heating electrode in front of and a corresponding heating electrode behind the narrowed cross-sectional area, and additionally heating the melt in the narrowed cross-sectional area with air/gas heat or oxygen/gas heat.

18. A process for melting glass comprising introducing melt into a glass melting tank having a cross-sectional area narrowed at least in the area of the melt, forming a large surface area of the melt relative to the volume of the melt in the narrowed cross-sectional area, and heating the narrowed cross-sectional area by at least one heating electrode in front of and a corresponding heating electrode behind the narrowed cross-sectional area, wherein a zone of increased temperature of the melt is formed in the narrowed cross-sectional area.

19. A process for melting glass comprising introducing melt into a glass melting tank having a cross-sectional area narrowed in the area of the melt, the narrowed cross-sectional area having a length of up to 15% of the length of the glass melting tank, and heating the narrowed cross-sectional area by at least one heating electrode in front of and a corresponding heating electrode behind the narrowed cross-sectional area wherein a zone of increased temperature of the melt is formed in the narrowed cross-sectional area.

20. A process according to claim 19, wherein the temperature of the melt in the narrowed cross section area is adjusted and controlled essentially by the current flow through the electrodes.

21. A process according to claim 20, wherein the narrowed cross section area is formed by an inward arching of a lateral surface or by an inward arching of two opposite lateral surfaces of the glass melting tank.

22. A process according to claim 21, wherein the narrowed cross section area is formed by a symmetrical inward arching of two opposite lateral surfaces of the glass melting tank.

23. A process according to claim 22, wherein the narrowed cross section area is formed by an inward arching of the bottom surface of the glass melting tank.

24. A process according to claim 19, wherein the melt is heated in areas located in front of or behind the narrowed cross-sectional area, electrically or with air/gas or with oxygen/gas.

25. A process according to claim 19 wherein the melt is refined in the narrowed cross section area.

26. A process according to claim 25, wherein a part of the narrowed cross-sectional area located above the glass melt is separated from the rest of the glass melting tank in a vapor-proof way.

27. A process according to claim 26, wherein the glass melt is vacuum refined in the narrowed cross section area.

28. A process according to claim 19, wherein the melt is heated by electrodes that project into the melt from below and from the lateral surface of the glass melting tank.

29. A process according to claim 28, wherein the electrodes are made of molybdenum or platinum.

30. A glass melting tank for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the electrodes being connected to one another to develop a voltage therebetween of up to 1500 v.

31. A glass melting tank for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the electrodes being connected to one another to develop a voltage therebetween of up to 1000 v.

32. A glass melting tank for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the electrodes being connected to one another to develop a voltage therebetween of up to 7000 A.

33. A glass melting tank for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the electrodes being connected to one another to develop a voltage therebetween of up to 5000 A.

34. A glass melting tank having an overall length for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the narrowed cross-sectional area having a length up to 15% of the overall length of the glass melting tank.

35. A glass melting tank for containing a glass melt, comprising at least one pair of heating electrodes projecting into the glass melt, wherein the glass melting tank has a narrowed cross-sectional area and wherein the glass melting tank has at least one heating electrode in front of and one heating electrode behind the narrowed cross-sectional area to achieve an increase in the temperature of the glass melt in the narrowed cross-sectional area, the narrowed cross-sectional area having a length of 150 cm, to 460 cm a width of 40 to 50 cm and a depth of 10 to 60 cm.

36. A process for melting glass comprising introducing melt into a glass melting tank having a cross-sectional area narrowed at least in the area of the melt to a width of 40 to 150 cm, the cross-sectional area having a length of 150 to 460 cm and a depth of 10 to 60 cm, and heating the narrowed cross-sectional area by at least one heating electrode in front of and a corresponding heating electrode behind the narrowed cross-sectional area, wherein a zone of increased temperature of the melt is formed in the narrowed cross-sectional area.

* * * * *